United States Patent
Nijboer et al.

(10) Patent No.: US 8,261,656 B2
(45) Date of Patent: Sep. 11, 2012

(54) APPARATUS FOR PREPARING A BEVERAGE FROM WATER-COOLED STERILIZED WATER AND AN INSTANT PRODUCT

(75) Inventors: Marie Sybien Nijboer, Drachten (NL); Klaas Kooijker, Drachten (NL); Joldert Maria Boersma, Drachten (NL); Fred Fraij, Drachten (NL); Peter Sofrides Viet, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 617 days.

(21) Appl. No.: 12/300,809

(22) PCT Filed: May 11, 2007

(86) PCT No.: PCT/IB2007/051793
§ 371 (c)(1),
(2), (4) Date: Nov. 14, 2008

(87) PCT Pub. No.: WO2007/135608
PCT Pub. Date: Nov. 29, 2007

(65) Prior Publication Data
US 2009/0151574 A1 Jun. 18, 2009

(30) Foreign Application Priority Data
May 19, 2006 (EP) .................................... 06114243

(51) Int. Cl.
*A47J 31/40* (2006.01)
(52) U.S. Cl. ........................ 99/282; 222/129.4; 165/258
(58) Field of Classification Search .................... 99/275, 99/289 R, 323.3, 348, 300, 302 R, 306, 307, 99/308, 309; 222/146.1, 146.6, 190, 129.4, 222/215, 129.3, 146.5, 132, 325, 609; 165/258, 165/253, 288, 48.1, 61, 63, 64, 236, 88, 50, 165/300, 65, 66; 62/393, 394, 399, 391, 62/85, 440, 310, 314, 121, 92, 93, 317; 219/618, 219/647, 678, 679, 430, 480, 494
See application file for complete search history.

(56) References Cited

U.S. PATENT DOCUMENTS

| | | | |
|---|---|---|---|
| 5,570,816 A * | 11/1996 | LaBarbera, Jr. | 222/129.4 |
| 5,975,365 A * | 11/1999 | Hsieh | 222/129.4 |
| 6,213,199 B1 * | 4/2001 | Al-Khateeb | 165/258 |
| 6,889,600 B2 * | 5/2005 | Rava | 99/323.3 |
| 7,104,184 B2 * | 9/2006 | Biderman et al. | 99/282 |
| 2005/0150393 A1 | 7/2005 | Biderman et al. | |

FOREIGN PATENT DOCUMENTS

| | | |
|---|---|---|
| DE | 3511159 A1 | 10/1986 |
| DE | 8813913 U1 | 5/1989 |
| EP | 1159907 A1 | 12/2001 |
| WO | 9318695 A1 | 9/1993 |
| WO | 9603067 A1 | 2/1996 |

* cited by examiner

*Primary Examiner* — Quang Van
*Assistant Examiner* — Phuong Nguyen

(57) ABSTRACT

An apparatus for preparing a beverage from water and an instant product includes a water supply system for supplying water, a heating device for sterilizing water by heating it; and a cooling device for cooling water heated in the heating device. The cooling device uses water from the water supply system as cooling-water. The water that is sterilized in the heating device has preferably previously been used in the cooling device as cooling-water. The cooling device includes a counter flow heat exchanger.

17 Claims, 3 Drawing Sheets

Figure 1:
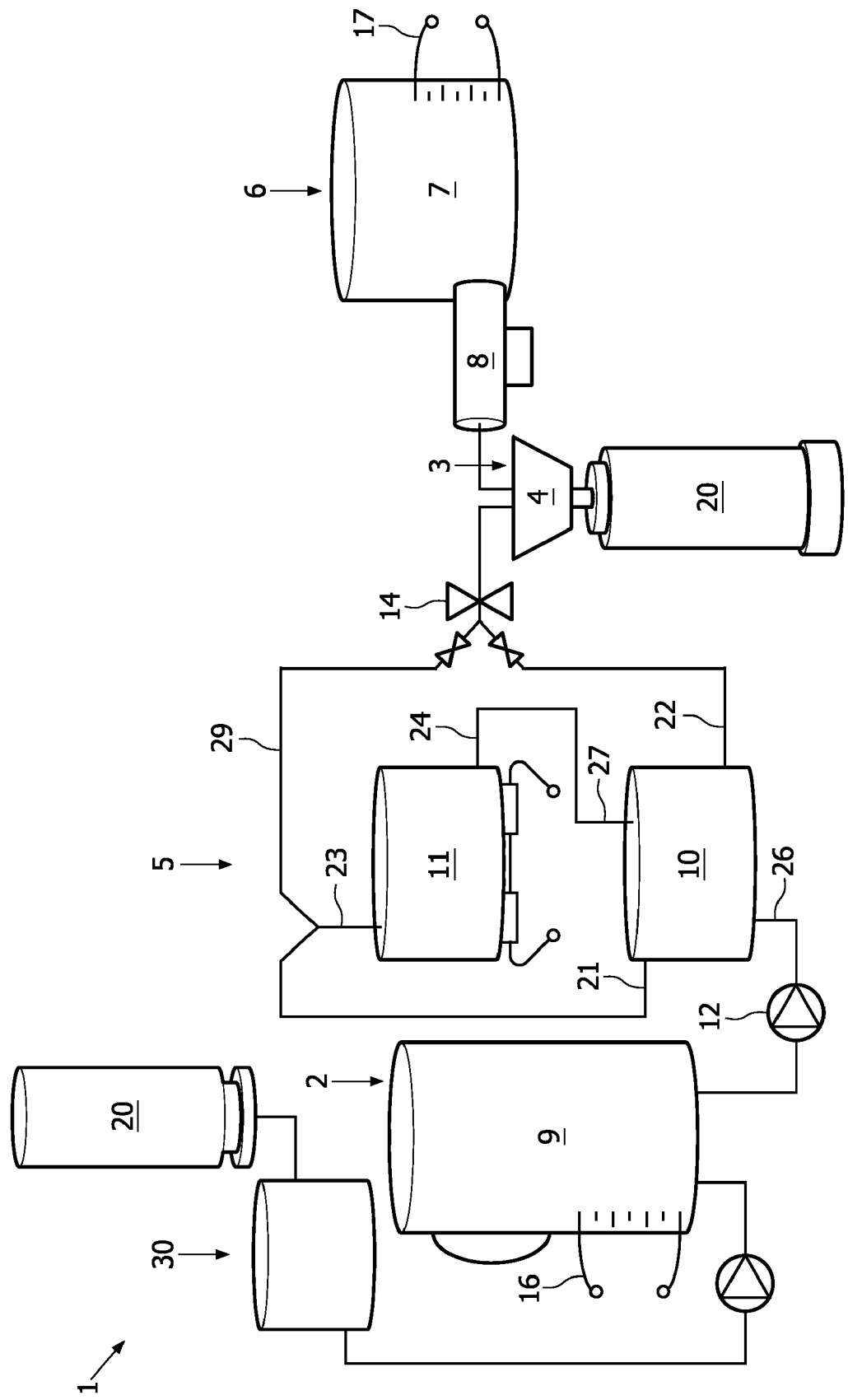

APPARATUS FOR PREPARING A BEVERAGE FROM WATER-COOLED STERILIZED WATER AND AN INSTANT PRODUCT

The invention relates to an apparatus for preparing a beverage from sterilized water and an instant product, more particularly for preparing baby milk from formula.

Apparatuses of this type are known. Typically, such known apparatus comprises a water supply system and a formula supply system for supplying predetermined amounts of water and formula into a mixing unit. The apparatus furthermore comprises a heating device, for sterilizing the water, and a cooling device for subsequently cooling down the water to a temperature acceptable for consumption. A disadvantage of these known apparatuses is that the heating and cooling operations are time and/or energy consuming.

For instance, from EP 1 159 907 an apparatus for preparing baby milk is known, including a reservoir in which sterilized hot water is left to cool down. Before use, the cooled water is reheated to the desired drinking temperature of for instance 35° to 45° Celsius. Obviously, the cooling down process is slow, resulting in long preparation times. Furthermore, the preparation process is little efficient now that water is first heated, then cooled and then heated again. The apparatus is unable to deliver cooled sterilized water in a substantially continuous flow and therefore unable for use in situations wherein a large amount of baby milk is to be prepared in a relatively short time, for instance at a toddlers playgroup.

From WO 93/18695 an apparatus for preparing baby milk is known, featuring a heat exchanger in which sterilized hot water is cooled down by cold air, which is forced along cooling ribs of the exchanger by a blower. Although this cooling process is faster than the aforementioned one, it is still rather slow and little efficient. Moreover, like the previous apparatus, this apparatus is not arranged to deliver a continuous flow of cooled water either. Additionally, the cooling ribs and the blower require a substantial amount of space, rendering the overall apparatus voluminous and difficult to handle.

Due to the abovementioned slow cooling processes, a user may be confronted with long waiting times, which may give aggravation, for instance when a baby is crying for its bottle or when preparation takes place in the middle of the night (not unusual given the feeding scheme for babies). Alternatively, the user may plan ahead in order to timely initiate the heating and cooling process. However, this too takes away much of the intended convenience of the apparatus.

It is therefore an objective of the present invention to provide an apparatus of the above-described type, wherein the disadvantages of the known apparatuses are avoided or at least partly reduced. More particularly, it is an objective of the invention to provide an apparatus for preparing a beverage from sterilized water and an instant product, featuring short preparation times.

It is furthermore an objective of the invention to have the water heated and subsequently cooled down in an energy-efficient way.

It is yet another objective of the invention to have the water heated and subsequently cooled down at accurately controlled temperatures, so as to ensure proper sterilization and an acceptable drinking temperature.

Still another objective of the invention is to provide a reliable apparatus, wherein failures are minimized, and if occurring, are communicated to a consumer.

To this end an apparatus according to the invention is characterized in that the cooling device uses water from the water supply system as cooling-water. Thanks to such arrangement, cooling down times can be shortened as water has a much larger heat transfer capacity than air. Furthermore, thanks to such larger heat transfer capacity, the cooling device can be built more compact than a cooling device using air as cooling-medium. Using water from the water supply system additionally offers the advantage that the already available pumping means, valves, reservoirs, pipe lines and the like of the water supply system can be used for transporting the cooling-water towards and through the cooling device, thereby obviating the need for a separate cooling fluid supply system. Consequently, the number of components, complexity and size of the apparatus can be reduced. Moreover, the use of plain water (from the water supply system) eliminates the risk of the sterilized water becoming contaminated with some unhealthy cooling fluid, in case of unforeseen leaks in the cooling device.

According to an advantageous aspect of the invention, heat withdrawn in the cooling device is used for pre-heating water that is supplied to the heating device. Thus, a very energy-efficient apparatus is obtained. In one embodiment, such re-use of heat can be realized by feeding cooling water from the cooling device into the heating device. This cooling-water is then sterilized in the heating device, and subsequently cooled down in the cooling device with newly supplied water from the water supply system, which in turn is fed to the heating device, etc. Since the cooling water will have an increased temperature when leaving the cooling device, it will be clear that less energy will be required to heat up said water to the sterilization temperature. Moreover, only one pump is needed to transport the water to the cooling device, the heating device and back to the cooling device successively, in a continuous flow.

According to another advantageous aspect of the invention, the cooling device comprises a counter flow heat exchanger. In this description, the term counter flow heat exchanger is understood to define a heat exchanger in which a cooling fluid is passed along a fluid to be cooled (here the sterilized water), wherein the flow directions of both fluids are substantially opposed to each other or at least enclose an obtuse angle with one another.

Thanks to such counter flow heat exchanger, the water heated in the heating device can be cooled down fast because the heat exchanger can withdraw a large amount of heat from the hot water. Consequently, water can be sterilized and subsequently cooled in a short time interval, enabling large amounts of baby milk (or more generally, another instant beverage) to be produced in an almost continuous process.

According to yet another advantageous aspect of the invention the heat exchanger may comprise a first tube, surrounded by a second tube, which together are wound into a substantially two-dimensional spiral. Thanks to such configuration the heat exchanger can have a large heat exchange surface, yet be of compact overall dimension. This too may contribute to minimize the overall size of the apparatus.

According to a further advantageous aspect of the invention, the sterilization of the water is performed at temperatures below 100 degrees Celsius. Applicant has found that acceptable sterilization levels can be attained, by heating water at temperatures below 100 degrees Celsius, provided the heating time is sufficiently long, wherein the required minimum heating time will reduce as the heating temperature increases. Thanks to such low sterilization temperatures, cooling down times may even further be reduced.

According to another preferred aspect of the invention safety provisions may be provided for monitoring specific process parameters of the apparatus, such as the sterilization temperature in the heating device, the flow rate of the water, the sterility of the water or the temperature of the sterilized water leaving the cooling device, etc. Preferably, communication means are provided to inform a user in case of a monitored failure or deviation. Additionally or alternatively, control means may be provided to adjust process parameters such as the sterilization temperature in the heating device or a flow rate in the heat exchanger, in order to bring the deviating parameter back to its desired value. Also, the preparation process may be stopped all together, for instance in case of severe failure, thereby preventing the apparatus from producing an inferior beverage. It will be understood that such safety provisions are particularly advantageous when the apparatus is used for preparing baby milk, in the absence of any direct feedback from the babies.

According to another aspect of the invention, a bypass may be provided allowing water from the heating device to bypass the cooling device. Such sterilized hot water may for instance be mixed with water leaving said cooling device, which may be slightly under cooled. By adding hot water, the water temperature may be fine-tuned to its final desired value, accurately and fast. Additionally or alternatively, said sterilized hot water can be used to clean components of the apparatus, or a baby bottle or teat. Further advantageous embodiments of an apparatus according to the invention are set forth in the dependent claims.

Figure 2:
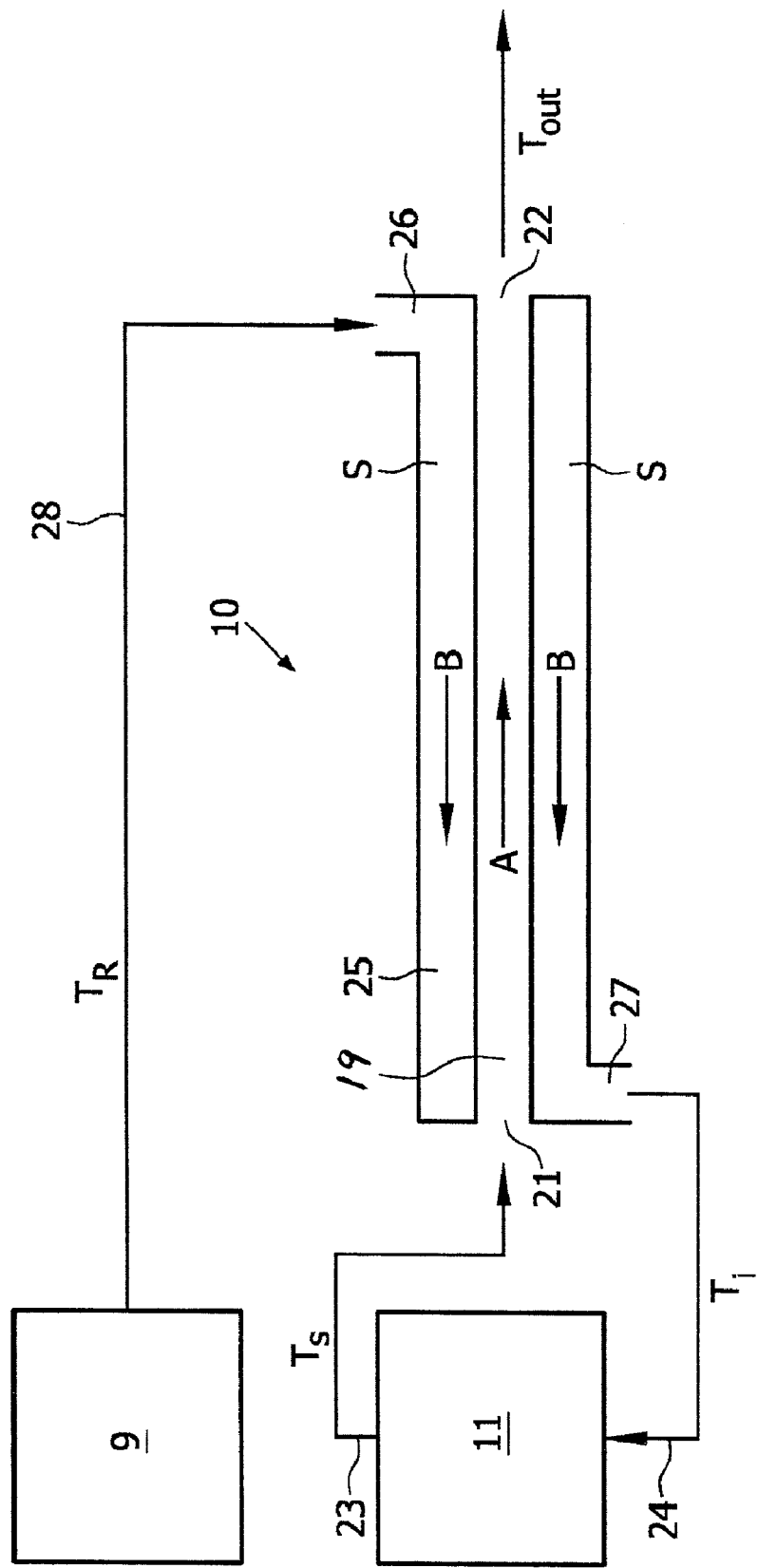
Figure 3:
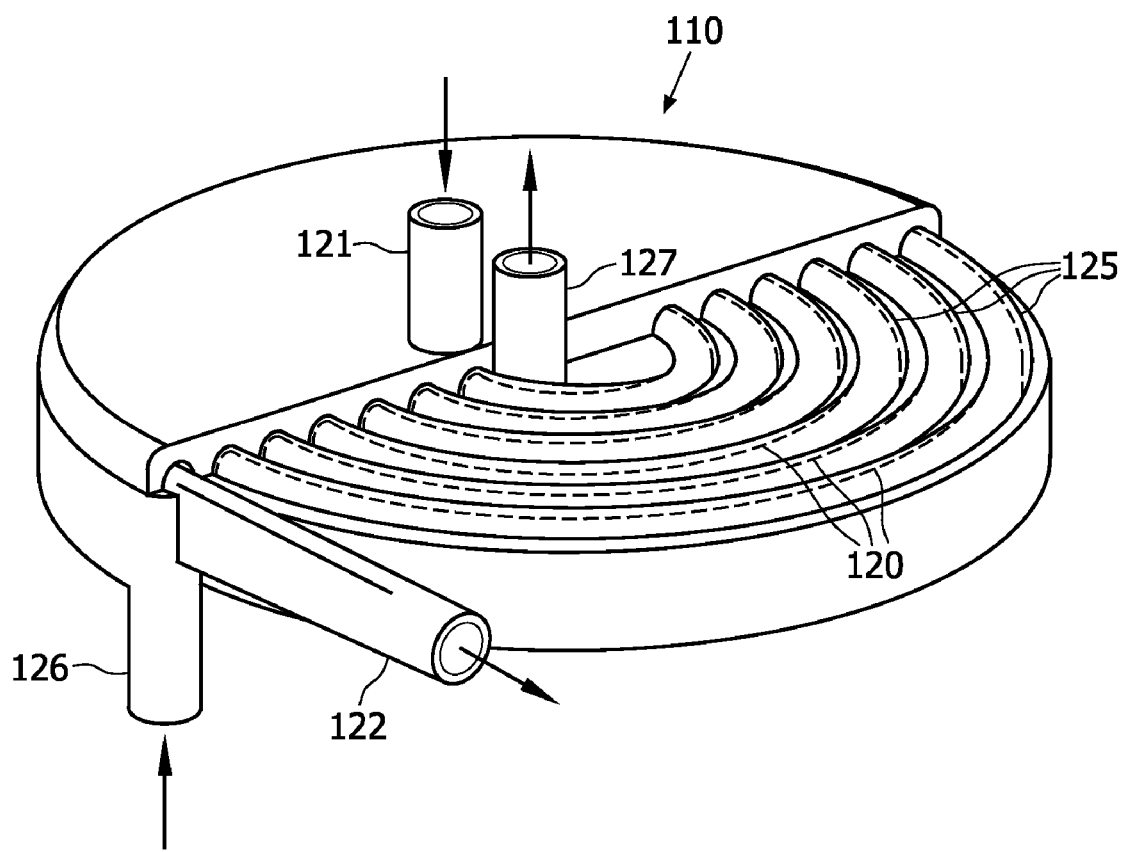

To explain the invention, exemplary embodiments thereof will hereinafter be described with reference to the accompanying drawings, wherein:

FIG. 1 schematically shows a general set-up of an apparatus according to the invention, suitable for preparing baby milk from dry formula;

FIG. 2 shows in cross section a first embodiment of a counter flow heat exchanger according to the invention; and FIG. 3 shows in perspective view an alternative embodiment of a counter flow heat exchanger according to the invention, shaped as a flat spiral.

In the following description, the invention will be explained in the light of an apparatus for preparing baby milk from formula, in particular dry formula. However, the invention is not limited to such application. It may for instance be applied in any beverage-preparing apparatus in which the use of sterile water is preferred, for instance in case where the intended consumers have little resistance, such as babies, elderly people or sick people, or in health related applications, wherein the apparatus is for instance used for preparing medical drinks or health enhancing drinks, or in case where the apparatus is going to be used in regions where the quality of tapping water is poor. Furthermore, in this description, the term sterile refers to 'commercially sterile' rather than the more strict 'clinically sterile'. Water that is commercially sterile may still contain bacteria, but the harmful ones have been destroyed or inactivated. For the present application, commercially sterile suffices.

The apparatus 1 shown in FIG. 1 comprises a mixing unit 3, a water supply system 2, a water purifying system 5 and a formula supply system 6 for feeding predetermined quantities of purified, in particular sterilized water, respectively formula to said mixing unit 3.

In the presented embodiment the mixing unit 3 comprises a mixing chamber 4, provided with suitable mixing provisions (not visible) for having the water and formula mixed to a smooth, homogeneous mixture, free of lumps.

In an alternative embodiment, mixing of the water and formula may take place outside the apparatus 1, for instance inside a special receptacle or in a baby bottle 20. Thus, contact between the apparatus 1 and the baby milk mixture can be avoided, which is advantageous from a hygienic point of view and may allow for less strict cleaning regulations. Examples of suitable mixing arrangements are for instance described in the non pre-published patent application of the applicant, entitled "Apparatus for preparing a beverage from an aqueous liquid and a fatty instant product, in particular baby milk", the contents of which are herein incorporated by reference.

The formula supply system 6 comprises a container 7 and a suitable discharge arrangement 8, for releasing and transporting desired amounts of formula from the container 7 to the mixing unit 3.

The discharge arrangement 8 may for instance comprise an auger, arranged underneath an outlet opening in the container 7. The container 7 can be funnel shaped, to guide the formula towards the outlet opening, under the influence of gravity. Additionally or alternatively, stirring or propelling means may be provided (not shown), to guide the sometimes-sticky formula even better towards the outlet opening so as to supply the underlying auger with a uniform, continuous feed. Suitable examples of such stirring and propelling means are described in the non pre-published patent application of applicant, entitled "Apparatus for preparing baby milk from instant formula" of which the contents are incorporated herein by reference.

The amount of formula led into the mixing unit 3 can for instance be controlled by having the auger 8 rotate at a predetermined speed during a predetermined amount of time or by counting its revolutions. Thus, the auger 8 can serve as transport and dosing device. Of course, other configurations are possible. For instance, transport can be done by a scraper, a piston, suction or air, whereas dosing may be done with a valves or a calibrated volume.

The formula, or more generally, the instant product, may be supplied in powder form or in any other commercially available form, such as a concentrated liquid or substance, or in standardized portions, for instance enough for one serving, such as pads, sachets, cups, etc. Depending on the supply format, the formula supply system 6 may be adapted accordingly.

In the illustrated embodiment, the water supply system 2 comprises a water reservoir 9, various supply lines, pumping means 12 and one or more valves 14. The pumping means 12 and valve or valves 14 can cooperate to transport predetermined amounts of water from the reservoir 9 to the purifying system 5 and/or mixing unit 3 and as such fulfill a transport and dosing function. Since such pumping means 12 and valves 14 are known per se, they need no further explanation. Their position in the water supply system 2 is freely selectable, i.e. more than one location is possible, and therefore the embodiment shown in FIG. 1 should not be construed as limiting but merely be seen as one possible example.

The water reservoir 9 is dimensioned to store an amount of water, for instance sufficient for a one days supply. Preferably, the water reservoir 9 and the aforementioned formula container 7 are detachably coupled to the apparatus 1, so as to allow easy filling, emptying and/or cleaning. The water reservoir 9 and/or formula container 7 may furthermore be at least partly transparent, so that a user can inspect their contents and supply levels. Additionally or alternatively, automatic detection means 16, 17 may be provided to detect low supply levels, alarm a user and/or shut down the apparatus 1, to prevent inferior baby milk from being produced. Instead of or in addition to a reservoir 9, the water supply system 2 may comprise a coupling for connection to a tap water main.

In the illustrated embodiment, the water purifying system 5 comprises a heating device 11 and a cooling device 10. The heating device 11 is arranged to sterilize water through heating and may for instance comprise an electric coil, or any other alternative heating means. Applicant has found that water can be made commercially sterile by heating the water at sterilization temperatures $T_s$ below 100° Celsius during a sufficient amount of heating time t, wherein the heating time t needs to be longer as the heating or sterilization temperature $T_s$ is lower, and wherein the minimum required sterilization temperature $T_s$ lies around 70° Celsius. For instance, when water is heated at $T_s$ is 70° Celsius, the heating time t is preferably at least 30 seconds, while when heating water at 80° Celsius or 90° Celsius, and the heating time t may be reduced to about 10 seconds. These values should not be construed as limiting, they are given for exemplary purposes only.

The cooling device 10 is arranged to cool down the hot sterilized water leaving the heating device 11 to a temperature ready for consumption. For baby milk this temperature may lie between room temperature and about 45° Celsius with a preference for 37° Celsius (being the body temperature).

According to the present invention, the cooling device 10 comprises a counter flow heat exchanger, of which one possible embodiment is schematically shown in FIG. 2. In this embodiment, the counter flow heat exchanger comprises a first body 19, for instance of tubular or plate-like shape, which is surrounded by a second body 25, of similar shape but slightly larger, so as to creates a flow passage S for a cooling-fluid around said first body 19. However, in other embodiments (not shown), the first and second body may be shaped and/or oriented differently. More generally, it suffices when the counter flow heat exchanger comprise two flow passages, which along their main flow direction are in thermal communication with each other.

In the embodiment of FIG. 2, the first body 19 is at one end provided with an inlet 21, for receiving hot water from the heating device 11, and near its other end, provided with an outlet 22, for allowing cooled down water to leave the exchanger 10. The second body 25 is provided with a cooling-fluid inlet 26, located near the outlet 22 of the first body 19, and a cooling-fluid outlet 27, located near the hot water inlet 21 of the first body 19.

In use, hot water from the heating device 11, having a sterilization temperature $T_s$, is fed through the first body 19 (indicated by arrow A), while a cooling-fluid 28, having a temperature $T_R$ that is lower than $T_s$ is fed through the flowing space S in the opposite direction (indicated by arrows B). Due to the temperature difference ($T_s - T_R$) between the hot water and the cooling-fluid, heat from the hot water will be transferred to the cooling-fluid, causing the initial temperature $T_s$, of the hot water to decrease gradually (in the direction of arrow A) towards an end temperature $T_{out}$ and the initial temperature $T_R$ of the cooling-fluid to increase gradually (in the direction of arrow B) towards an end temperature $T_i$.

In one embodiment (not shown) the cooling-fluid inlet 26 and outlet 27 of the heat exchanger 10 can be connected to a supply line and a return line of a separate cooling-fluid supply system so as to form a closed loop in which a suitable cooling-fluid can circulate.

In an alternative embodiment, the cooling-fluid inlet 26 may be connected to the water supply system 2 in FIGS. 1 and 2, in particular the water reservoir 9 thereof, so that said water can serve as cooling-fluid. The cooling-fluid outlet 27 can be connected to said water reservoir 9 as well, for returning the used cooling water to said reservoir 9. However, this will cause the water temperature in the reservoir 9 to increase slowly, during use, thereby causing the cooling efficiency of the heat exchanger 10 to decrease gradually.

Therefore, in an alternative and preferred embodiment, the cooling-fluid outlet 27 of the heat exchanger 10 is connected to an inlet 24 of the heating device 11, as shown in FIGS. 1 and 2. Consequently, water that has been used in the heat exchanger 10 as cooling-fluid, will subsequently be sterilized in the heating device 11 and used for preparing baby milk. With such arrangement, heat withdrawn in the heat exchanger 10 is not lost, but stored in the water that is supplied to the heating device 11. Consequently, less energy will be needed to heat this water up to the sterilization temperature $T_s$. Furthermore, with this arrangement, the heat exchanger 10 is ensured of a continuous supply of fresh cooling-fluid, with a substantially constant temperature (i.e. the temperature $T_R$ in reservoir 9, which may be kept at ambient temperature or at some cooled temperature). Thanks to such constant supply, the heat exchanger 10 can maintain a substantially constant, large cooling capacity.

The apparatus 1 according to the invention may furthermore comprise a sterilizing device 30 for sterilizing bottles 20, teats or other parts of the apparatus 1, as shown in FIG. 1. Conveniently, this device 30 may use sterilized water from the heating device 11 or cooling device 10. Alternatively, steam may be used. Such steam may for instance be produced in a thermoblock, using water from the water reservoir 9 or the heating device 11, as described in the non pre-published patent application of applicant, entitled "Apparatus for preparing a beverage from sterilized water of a predetermined consumption temperature" the contents of which are incorporated herein by reference.

The apparatus 1 may further comprise a storage medium (not shown), for storing information regarding for instance different feeding programs, prescribed water/formula concentrations depending on the formula brand, age and/or weight of the toddler, safety threshold values for triggering an alarm when exceeded, etc. Preferably, this storage medium is programmable, so as to allow a user to store its personal preferences. A controller (not shown) may be provided for controlling selected process parameters towards a desired set point, such as the water temperatures in the various stages of the preparation process, flow rates, etc. Controlling can be done by adjusting for instance the capacity of the pumping means 12, the rotational speed of the auger 8, a passage opening of the valves 14, etc.

The apparatus 1 can be used as follows. Before starting operation, the reservoir 9 is filled with water and the container 7 is filled with formula. Next, the user may select a specific preparation program, the amount of baby milk to be prepared, a desired water/formula concentration, etc. Then, water is pumped from the reservoir 9 into the heating device 11 for sterilization. As discussed above, sterilization is done by heating said water at a predetermined temperature Ts below 100□ Celsius, during a predetermined time interval t. The sterilized water from the heater outlet 23 is subsequently passed through the counter flow heat exchanger 10, where it is cooled down to a temperature Tout with water from the reservoir 9. Next, the cooled down water is supplied to the mixing unit 3. Before entering the mixing unit 3, the water temperature Tout may be fine tuned, e.g. to 37□ Celsius, for instance by passing said water along a heating element (not shown), or by adding some hot water from the heating device 11 via bypass 29 (see FIG. 1).

Next the desired quantity of water can be dosed into the mixing unit 3, for instance by means of valve 14 and/or pump 12. Meanwhile, an appropriate amount of formula has been transported from the container 7 to the mixing unit 3 by means of the discharge arrangement 8, as described above. Then, water and formula are supplied to the mixing unit 3 and the resulting mixture is poured into a bottle 20 or other receptacle, ready for consumption.

In a preferred operation mode, activation and deactivation of the water supply system 2 and the formula supply system 6 is adjusted to each other in such way that each mixing session starts and ends with a small amount of water. At the start of the session this water can form a film at the inside of the mixing chamber 4, thereby preventing formula from sticking thereto. At the end of the mixing session, the water may wash away any remains of the mixture. Thus, contamination of the mixing unit 3 can be avoided or at least reduced.

FIG. 3 shows an alternative embodiment of a counter flow heat exchanger 110 according to the invention, wherein components similar to the ones shown in FIG. 2 have been denoted with similar reference numerals, increased by 100. In this embodiment the first and second bodies 119, 125 are configured as elongated tubes, wherein the first tube 119 extends within the second tube 125, and both tubes together are wound into a spiral. In this configuration, the hot water to be cooled may flow through the first, inner tube 119, while the cooling-fluid may flow through the second, surrounding tube 125, in opposite directions, as indicated by the arrows. In FIG. 3 the inlet 121 of the first, hot water tube 119 and outlet 127 of the second, cooling-fluid tube 125 are shown to extend near the center of the spiral, while their outlet 122, respectively inlet 126 extend at the outer circumference of the spiral. Of course said in- and outlets can be interchanged, as long as the hot water and the cooling-fluid flow in opposite directions. With this configuration the hot water is surrounded by cooling-fluid on all sides, which results in a large heat transferring area and therefore excellent heat transfer capacity, while the total volume of the exchanger 110 is small. In alternative embodiments, the cooling-fluid may flow through the inner tube 119 and the hot water through the outer tube 125. Also, the tubes 119, 125 may be bend differently, for instance in a three-dimensional spiral. As such the outer shape of the counter flow heat exchanger 110 can be adapted according to available space in the apparatus 1.

The invention is not in any way limited to the exemplary embodiments shown in the description and the figures. All combinations (of parts) of the embodiments shown and described are explicitly understood to be incorporated within this description and to fall within the scope of the invention. Moreover, many variations are possible within the scope of the invention, as outlined by the claims.

The invention claimed is:

1. An apparatus for preparing a beverage from water and an instant product, the apparatus comprising:
   a water supply system for supplying water to a cooling device;
   a heating device for sterilizing water supplied from the cooling device by heating the water supplied from the cooling device; and
   a mixing unit for mixing the instant product with the sterilized water, wherein an outlet of the heating device is connected to an inlet of the cooling device and an inlet of the mixing unit,
   wherein the cooling device is configured to cool water that has been heated in the heating device; and wherein the cooling device uses water from the water supply system as cooling-water, and
   wherein a first outlet of the cooling device is connected to an inlet of the heating device, and a second outlet of the cooling device is connected to the mixing unit.

2. The apparatus according to claim 1, wherein the cooling device and the heating device are arranged such, that heat withdrawn from the water in the cooling device is used to preheat water supplied to the heating device.

3. The apparatus according to claim 1, wherein the cooling device and the heating device are arranged such, that water from the water supply system, before being fed into the heating device for sterilization, is used in the cooling device as cooling-water.

4. The apparatus according to claim 1, wherein the cooling device comprises a counter flow heat exchanger.

5. The apparatus according to claim 4, wherein the counter flow heat exchanger comprises a first tube, surrounded by a second tube, which tubes are wound into a spiral.

6. The apparatus of claim 4, wherein a hot water inlet of the heating device and a cold water outlet of the cooling device are located near a center of the spiral, and a hot water outlet of the heating device and a cold water inlet of the cooling device are located near an outer circumference of the spiral.

7. The apparatus of claim 4, wherein a hot water inlet of the heating device and a cold water outlet of the cooling device are located near an outer circumference of the spiral, and a hot water outlet of the heating device and a cold water inlet of the cooling device are located near a center of the spiral.

8. The apparatus according to claim 1, wherein the heating device is arranged to sterilize water by heating said water at sterilization temperatures below 100° C., during a minimum time interval that increases with decreasing sterilization temperature.

9. The apparatus according to claim 8, wherein the heating device is arranged to heat the water at a sterilization temperature equal to or higher than 70° C.

10. The apparatus according to claim 1, furthermore comprising one or more safety provisions, for monitoring selected process parameters, and initiate an action when a threshold value is exceeded, wherein the action includes at least one of alarming a user, shut down the apparatus, and taking corrective action to bring the selected process parameters back to desired levels.

11. The apparatus according to claim 1, further comprising a bypass configured to allow heated water from the heating device to bypass the cooling device.

12. The apparatus of claim 4, wherein the counter flow heat exchanger comprises a first tube, surrounded by a second tube, which tubes are wound into a three-dimensional spiral.

13. A method for preparing a beverage from water and an instant product, the method comprising the acts of:
   supplying water from a water supply system to a cooling device;
   sterilizing water supplied from the cooling device by heating the water supplied from the cooling device using a heating device; and
   mixing the instant product with the sterilizing water to form the beverage;
   wherein the cooling device is configured to cool water that has been heated in the heating device and wherein the cooling device uses water from the water supply system as cooling-water, and
   wherein an outlet of the heating device is connected to an inlet of the cooling device and an inlet of the mixing unit, and wherein a first outlet of the cooling device is connected to an inlet of the heating device, and a second outlet of the cooling device is connected to the mixing unit.

14. The method of claim 13, further comprising the act of using heat withdrawn from the water in the cooling device to preheat water supplied to the heating device.

15. The method of claim 13, further comprising the act of using water from the water supply system in the cooling device as the cooling-water before feeding water from the cooling device into the heating device for sterilization.

16. The method of claim 13, wherein the cooling device comprises a counter flow heat exchanger.

17. The method of claim 16, wherein the counter flow heat exchanger comprises a first tube, surrounded by a second tube, which tubes are wound into a spiral.

* * * * *